UNITED STATES PATENT OFFICE.

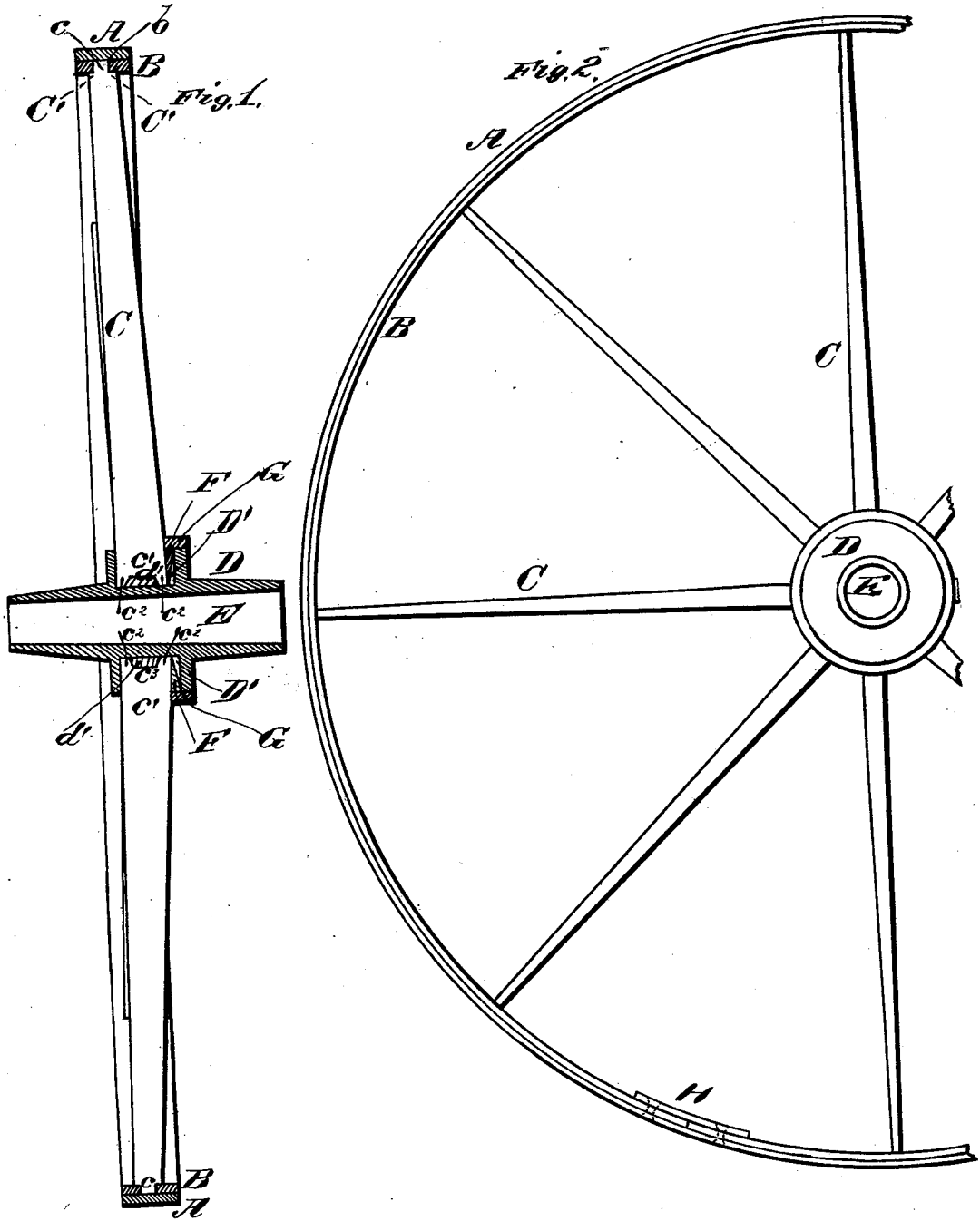

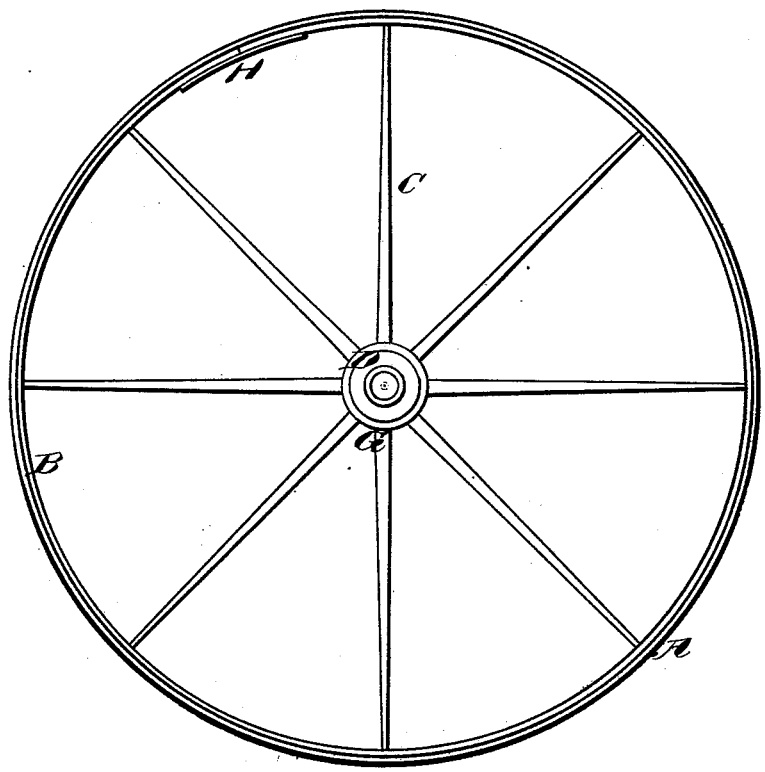

JOHN E. HOWELL, OF EL DORADO, MISSOURI.

IMPROVEMENT IN VEHICLE-WHEELS.

Specification forming part of Letters Patent No. 187,859, dated February 27, 1877; application filed September 16, 1876.

*To all whom it may concern:*

Be it known that I, JOHN E. HOWELL, of El Dorado, in the county of Clark and State of Missouri, have invented a new and valuable Improvement in Wagon-Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my wagon-wheel, and Fig. 2 is a longitudinal vertical sectional view thereof. Fig. 3 is also a side elevation of my wagon-wheel.

This invention relates to carriage and wagon wheels; and it consists in wedges for fastening the ends of the spokes into the spoke-sockets, and in an annular band for holding said wedges in place. It also consists in the peculiar construction of the wheel, as hereinafter particularly set forth.

In the annexed drawings, A designates the tire of my wheel; B, the felly; C C, the spokes; D, the hub provided with spoke-sockets; D' and E, the axle-box, extending on both sides of said hub, outwardly and inwardly. The said hub D and axle-box E are of cast-iron; but the said tire A, felly B, and spokes C C are of wrought-iron. The said spokes are constructed with angular shoulders C' C', which rest against the felly B, and secured to the said felly by cylindrical tenons $c\ c$, which enters holes or sockets $b\ b$ in said felly. The other inner end of each of said spokes is expanded at $c^1$, and provided with downwardly-extending horns $c^2\ c^2$, having a recess, $c^3$, between them. Said expanded end $c^1$ sets into a mortise or socket, D', in hub D, which mortise or socket is of equal width at all parts of its depth, and provided at its bottom with a cross-bar, $d'$, which fits said recess $c^3$. Said spokes are secured in said sockets by means of wedges F, one of which is driven in by the side of the edge of each one of said spokes. Said wedges are held in place by an annular band, G, which is shrunk or otherwise secured upon said hub and wedges.

By constructing the hub of cast-iron and the other parts of the wheel of wrought-iron, I combine elasticity with cheapness and avoid the defects incident to wheels constructed entirely of either material. Said felly B is constructed in a single piece, with only one opening, which is closed by means of a fastening-plate, H. The said fastening-plate is tightly riveted to the felly and tire. The felly may be at other points secured to the tire by riveting and countersinking. The felly on the outside of each spoke-hole is countersunk, and each spoke is firmly riveted to the fellies.

What I claim as new, and desire to secure by Letters Patent, is—

1. In an iron wagon-wheel, the combination of wrought-iron spokes C, iron hub having sockets D' D', equal in width at all parts of their length, iron wedges F, and annular band G, substantially as described.

2. Spoke-sockets D', provided with projections $d'$, in combination with recessed spoke C, having projections $c^2\ c^2$, wedges F, and band G, substantially as set forth.

In testimony that I claim the above I have hereunto subscribed my name in the presence of two witnesses.

JOHN E. HOWELL.

Witnesses:
   C. B. MATTOCH,
   A. S. NOTESTEIN.